United States Patent [19]
Volkrodt

[11] 4,011,479
[45] Mar. 8, 1977

[54] STATOR CONSTRUCTION FOR A PERMANENT MAGNET-EXCITED D-C MACHINE

[75] Inventor: Wolfgang Volkrodt, Bad Neustadt,Saale, Germany

[73] Assignee: Siemens Aktiengesellschaft, Munich, Germany

[22] Filed: Dec. 15, 1975

[21] Appl. No.: 640,960

[30] Foreign Application Priority Data

Dec. 20, 1974  Germany ............................ 2460630

[52] U.S. Cl. .............................. 310/186; 310/181; 310/154; 310/224
[51] Int. Cl.² .......................................... H02K 1/10
[58] Field of Search .......... 310/154, 181, 186, 224, 310/223, 184

[56] References Cited
UNITED STATES PATENTS

| | | | |
|---|---|---|---|
| 1,311,542 | 7/1919 | Turbayne | 310/181 |
| 2,128,044 | 8/1938 | Grabner | 310/181 X |
| 2,666,886 | 1/1954 | Harding et al. | 310/181 X |
| 3,296,471 | 1/1967 | Cochardt | 310/154 |
| 3,576,456 | 4/1971 | De Wolf | 310/186 |
| 3,862,445 | 1/1975 | Volkrodt | 310/181 X |

FOREIGN PATENTS OR APPLICATIONS 988,891  4/1965  United Kingdom ............... 310/186

Primary Examiner—Donovan F. Duggan
Attorney, Agent, or Firm—Kenyon & Kenyon Reilly Carr & Chapin

[57] ABSTRACT

A permanent magnet-excited d-c machine including a stator, a plurality of flux-conducting pieces disposed in the stator, and a plurality of tangentially magnetized permanent magnets disposed in the stator between each of the flux-conducting pieces. Compensation slots are provided in the flux-conducting pieces on both sides of each of the permanent magnets and form a compensation tooth on the flux-conducting pieces between each of the slots and the permanent magnets in the stator. A winding is disposed in the slots adjacent each magnet and is looped around each magnet and each compensation tooth disposed between the compensation slots.

1 Claim, 2 Drawing Figures

STATOR CONSTRUCTION FOR A PERMANENT MAGNET-EXCITED D-C MACHINE

BACKGROUND OF THE INVENTION

1. Field of the Invention

This invention relates generally to permanent magnet-excited d-c machines, and in particular to an improved stator construction for such machines which provides a commutating zone in machines which cannot accommodate conventional commutating poles.

2. Description of the Prior Art

If higher rotational speeds and/or higher armature voltages are used in permanent magnet-excited d-c motors, satisfactory commutation and adequate brush life can be achieved only if commutation poles are utilized. Stators including a plurality of poles and tangentially magnetized permanent magnets clamped between soft-iron flux-conducting pieces are known, but the space required for accommodating commutating poles in the neutral zone of such stators is not available.

SUMMARY OF THE INVENTION

It is therefore an object of the present invention to overcome the aforementioned disadvantages of heretofore known permanent magnet-excited d-c machines and to provide an improved stator construction for such machines which produces a commutation zone without the use of conventional commutating poles.

These and other objects are achieved in a permanent magnet-excited d-c machine including a stator, a plurality of flux-conducting pieces disposed in the stator, and a plurality of tangentially magnetized permanent magnets disposed in the stator between each of the flux-conducting pieces. The improvement of the invention comprises compensation slots disposed in the flux-conducting pieces on both sides of each of the permanent magnets. The slots each form a compensation tooth on the flux-conducting pieces between each of the slots and the permanent magnets. A winding is disposed in the slots adjacent each magnet and is looped around each magnet and each compensation tooth disposed between the compensation slots. Counter-ampere-turns are thus produced in the flux-conducting pieces which compensate the armature ampere-turns in the pieces and thereby create a reversing zone for commutation in the machine. The invention accordingly provides a commutating zone in permanent magnet-excited d-c machines which cannot accommodate conventional commutating poles.

These and other features of the invention disclosed herein will be described in greater detail in the following detailed description.

BRIEF DESCRIPTION OF THE DRAWINGS

In the drawings, wherein similar reference numerals denote similar elements throughout the several views thereof.

DETAILED DESCRIPTION

Figure 1:
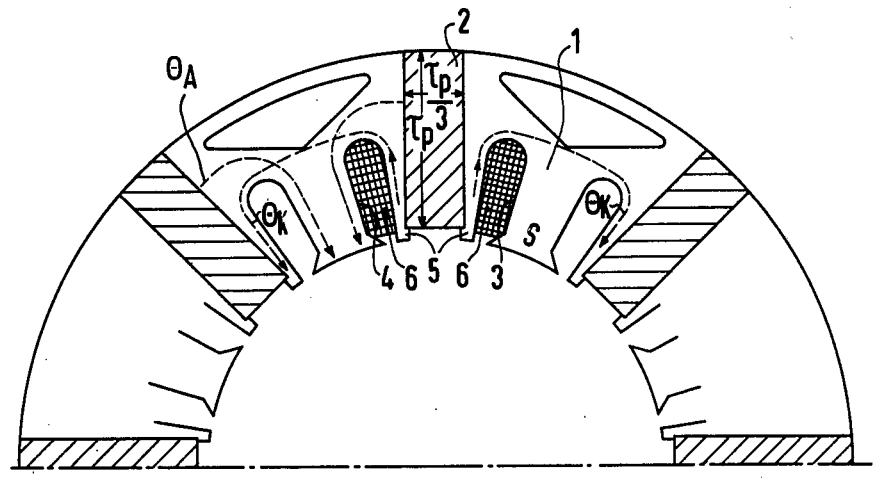
FIG. 1 is a partial, cross-sectional view of an improved stator construction for a permanent magnet-excited d-c machine constructed according to the invention.

Referring now to the drawings, there is shown the stator of a four pole, permanent magnet-excited d-c machine including a plurality of tangentially magnetized permanent magnets 2 disposed between a plurality of spaced-apart, flux-conducting pieces 1 of the stator. Compensation slots 3 and 4 are disposed in the flux-conducting pieces 1 on both sides of each of permanent magnets 2 and form a compensation tooth 5 on each of the flux-conducting pieces between each compensation slot and permanent magnet adjacent thereto. A compensation winding is disposed in compensation slots 3 and 4 and is looped around each permanent magnet 2 and each compensation tooth 5 disposed between the slots 3 and 4. The compensation winding builds up counter-ampere-turns $O_k$ in pieces 1 which have the same direction in each compensation tooth 5 and are larger than the armature ampere-turns $O_A$ in the flux-conducting pieces of the machine. A reversing zone suitable for a usable commutation is thus created in the stator of the machine.

Figure 2:
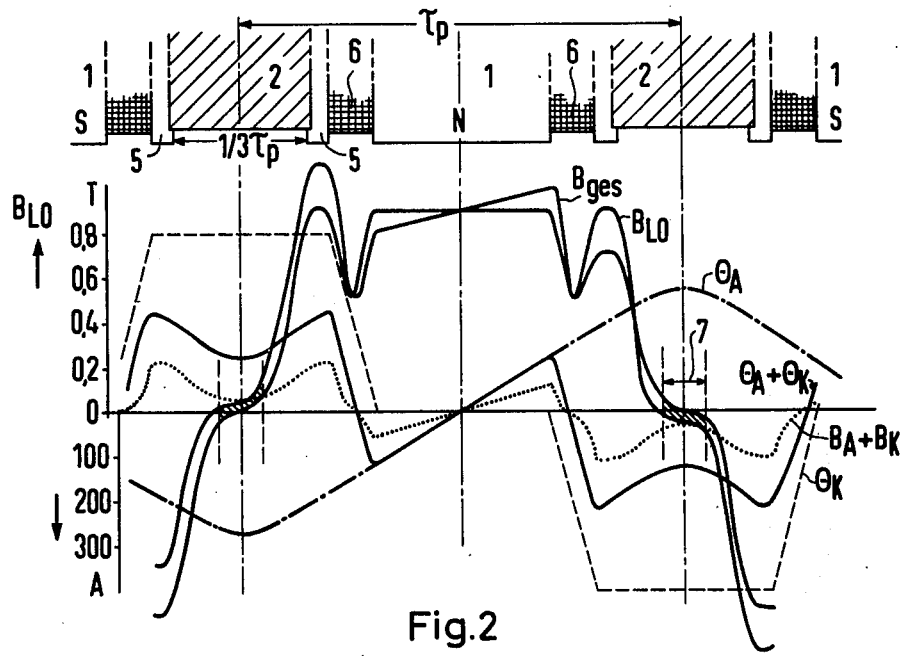
FIG. 2 is a graphical diagram of the magnetic field curves of a permanent magnet-excited d-c machine including a stator constructed according to the invention.

FIG. 2 diagrammatically illustrates the magnetic field curves of the machine. In the drawing, $O_A$ represents the armature ampere-turns; $O_K$ represents the counter or compensation ampere-turns; $B_A + B_K$ represents the induction resulting from the superimposed armature and compensation ampere-turns; $B_{Lo}$ represents the excitation field induction; and $B_{ges}$ represents the total field induction. As shown in the figure, the superposition of the exitation, armature and compensation fields produces a reversing zone 7 (bounded by the dashed lines in the drawing) which is desired and necessary for satisfactory commutation in the machine.

In the foregoing, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. In a permanent magnet-excited d-c machine including a stator, a plurality of flux-conducting pieces disposed in said stator, and a plurality of tangentially magnetized permanent magnets disposed in said stator between each of said flux-conducting pieces, the improvement comprising compensation slots disposed in said flux-conducting pieces on both sides of each of said permanent magnets, said slots each forming a compensation tooth on said flux-conducting pieces between each of said slots and said permanent magnets, and a winding disposed in said slots adjacent each magnet and looped around each said magnet and each compensation tooth disposed between said slots, so as to form counter-ampere-turns in said pieces for compensating armature-ampere-turns in said pieces thereby providing a reversing zone for commutation in said machine.

* * * * *